United States Patent [19]
Ueda et al.

[11] 3,819,949
[45] June 25, 1974

[54] CONTROL SYSTEM FOR ELECTRIC INSTALLATIONS

[75] Inventors: Atsushi Ueda; Mitsuaki Ishii, both of Himeji, Japan

[73] Assignee: Mitsubishi Denki Kabushiki Kaisha, Tokyo, Japan

[22] Filed: Jan. 2, 1973

[21] Appl. No.: 320,684

[52] U.S. Cl. .............................. 307/10 R, 307/155
[51] Int. Cl. ............................................. H02g 3/00
[58] Field of Search.......... 307/10 R, 106, 152, 155; 324/15

[56] References Cited
UNITED STATES PATENTS

| | | | |
|---|---|---|---|
| 1,904,149 | 4/1933 | Leonard............................ | 324/15 X |
| 2,645,751 | 7/1953 | Byerlay............................. | 324/15 |
| 3,564,280 | 2/1971 | Glenshaw et al.................. | 307/10 R |
| 3,651,454 | 3/1972 | Venema et al.................... | 307/10 R |
| 3,683,197 | 8/1972 | Ives.................................. | 307/10 R |

Primary Examiner—Robert K. Schaefer
Assistant Examiner—M. Ginsburg
Attorney, Agent, or Firm—Wenderoth, Lind & Ponack

[57] ABSTRACT

A control system for electric installations is disclosed. In response to one rotation signal for each revolution of an engine, control intelligences in the form of a time-divided multiplexed pulse train is transmitted through a single transmission line to a plurality of detector units, the pulse train having an index pulse resulting from the rotation signal. In each detector unit the counting of the trains's pulses is initiated by the index pulse to determine that pulse assigned to an electric installation connected to the detector unit. At that time, the corresponding control intelligence pulse is restored from the pulse train to control the electric installation. A fixed frequency oscillator provides the rotation signal at rotational speeds of the engine which are less than a predetermined speed.

9 Claims, 4 Drawing Figures

CONTROL SYSTEM FOR ELECTRIC INSTALLATIONS

BACKGROUND OF THE INVENTION

This invention relates to a control system for electric installations, and more particularly to a control system for controlling a plurality of electric installations equipped on a vehicle or the like through the use of a small number of lengths of control wire.

Electric installations equipped on the vehicle or the like involve those controlled at will by its operator or driver, for example, the headlight, wiper etc., indicators such as an ammeter and controls including regulators. In view of the standpoint of security, public nuisance etc., a tendency has recently developed to increse the number and types of electric installations equipped on the vehicle. This has led to an increasingly complicated circuit configuration of electric wire which is required for the connections to the many electric installations and therefore to an increase in costs of manufacturing and installing them. Also it has become very difficult to check and repair the electric installations upon their failures. Furthermore, it is desirable to prevent the control system from being affected by noise resulting from a local ignition system.

SUMMARY OF THE INVENTION

Accordingly it is an object of the invention to provide a new and improved control system for controlling a plurality of electric installations equipped on a vehicle or the like with the required control wiring having a simplified circuit configuration which only requires a small number of lengths of control wiring.

It is another object of the invention to provide a new and improved control system for controlling a plurality of electric installations equipped on a vehicle or the like which are protected against being affected by noise caused by a local ignition system.

The present invention accomplishes these objects by the provision of a control system for controlling electric installations, comprising, in combination, a plurality of electric installations used incidentally with an appliance provided with a rotary machine, a plurality of control operating means each provided for a different one of the electric installations, transmission and control means responsive to the operation of the control operating means to transmit control signals in the form of a time-divided multiplexed signal to the electric installations to control the latter, and means for controlling the initiation point of each unit time for the time-divided transmission of the time-divided multiplexed signal in accordance with the state of rotation of the rotary machine.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
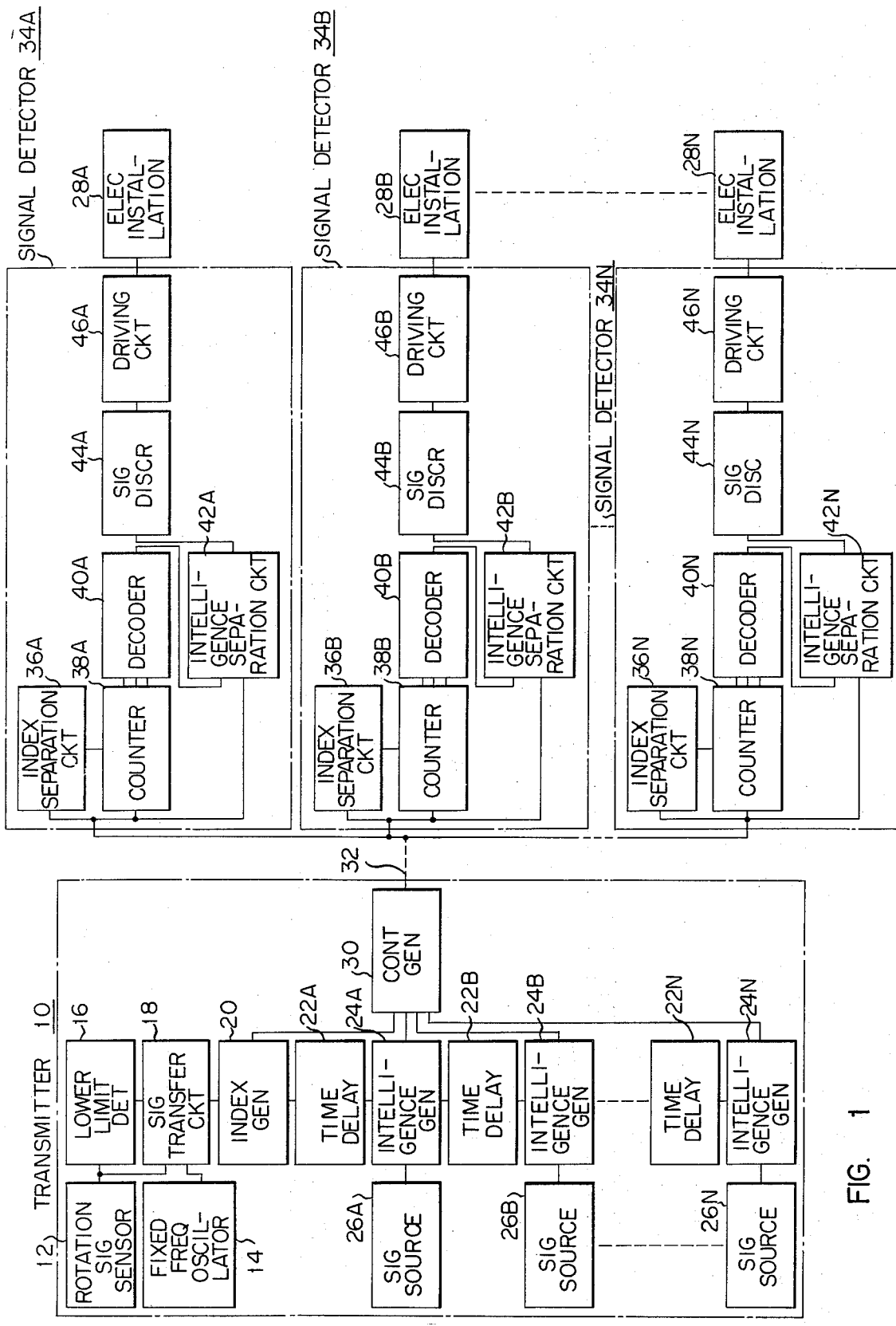
FIG. 1 is a block diagram of a control system constructed in accordance with the principles of the invention.

Referring now to FIG. 1, a control system for controlling a plurality of electric installations in accordance with the principles of the present invention is illustrated. The arrangement illustrated includes a transmitter unit generally designated by the reference numeral 10 and comprising a rotation signal sensor circuit 12 for sensing a rotation signal representing the rotational movement of a rotary machine such as an internal combustion engine equipped on a vehicle or the like, and a fixed frequency oscillator 14 for generating a predetermined fixed frequency. The rotary machine and vehicle are not illustrated since they are not deemed necessary to an understanding of the system. The rotation signal sensor circuit 12 is connected to a lower limit detector circuit 16 for detecting a lower limit of the number of rotation in unit time of the engine as will be described hereinafter and also to one input of a signal transfer circuit 18. The transfer circuit 18 has other inputs connected to the oscillator and detector circuits 14 and 16 respectively and an output connected to an index pulse generator circuit 20 subsequently connected to a series combination of time delay circuits 22A, 22B, . . . , 22N and alternating intelligence pulse generator cirsuits 24A, 24B, . . . , 24N.

As shown in FIG. 1, the transmitter unit 10 further includes a plurality of signal sources 26A, 26B, . . . , 26N, one for each of electric installations 28A, 28B, . . . , 28N disposed in place on the vehicle (not shown) and connected to the respective intelligence pulse generator circuits 24A, 24B, . . . , 24N. The pulse generators 20 and 24A, 24B, . . . , 24N are connected to a control signal generator circuit 30 which is, in turn, connected to a single transmission line 32 leading to a plurality of signal detector units generally designated by the reference numerals 34A, 34B, . . . , 34N which are connected to the individual electric installations 28A, 28B, . . . , 28N respectively. It will readily be understood that the signal detector units 34A, 34B, . . . , 34N are disposed in their positions as determined by the positions of the associated electric installations 28A, 28B, . . . , 28N.

The signal detector units 34A, 34B, . . . , 34N are of the same construction and therefore only one of the detector units, for example, the signal detector unit 34A will now be described. The signal detector unit 34A comprises an index separation circuit 36A connected to the transmission line 32, and a counter circuit 38A, one input thereof also connected to the transmission line 32 and the other input being connected to the index separation circuit 36A. The counter circuit 38A is connected through a plurality of electric leads (three in the embodiment illustrated) to a decoder circuit 40A the output of which is connected to an intelligence separation circuit 42A. The intelligence separation circuit 42A is connected to the electric installation 28A through a signal discriminator circuit 44A and a driving circuit 46A serially connected thereto.

In each of the remaining signal detector units the components are designated by the same reference numerals as the corresponding components of the detector unit 34A suffixed with the reference letter identifying the specific detector unit. For example, the decoder circuit included in the signal detector unit 34B is designated by 40B.

The operation of the arrangement as shown in FIG. 1 will now be described with reference to FIG. 2. The transmitter unit 10 produces a control signal in the form of a time-divided multiplexed signal from the intelligence signals provided by the signal sources 26A, 26B, . . . , 26N one for each of the electric installations 28A, 28B, . . . , 28N which is delivered to the signal detector units 34A, 34B, . . . , 34N through the single transmission line 32 for the purpose of controlling the electric installations 28A, 28B, . . . , 28N.

Figure 2:
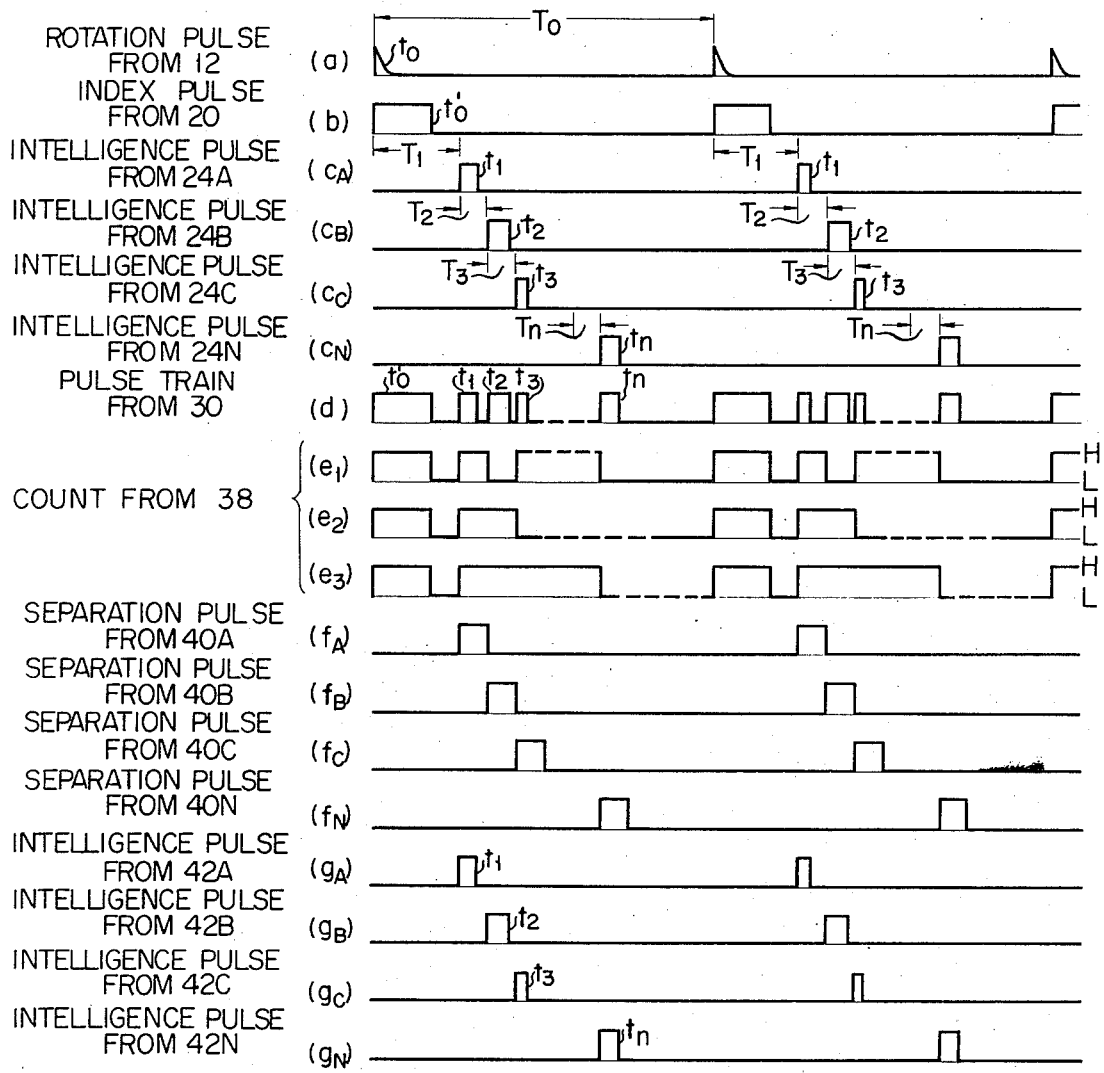
FIG. 2 is a graph illustrating waveforms developed at various points in the arrangement shown in FIG. 1.

More specifically, the rotation signal sensor circuit 12 may preferably sense the ON or OFF state of the associated breakers contacts (not shown) to provide rotation pulses $t_o$ as shown at waveform $a$ in FIG. 2. Those pulses have a pulse repetition period $T_o$ inversely proportional to the rate of rotation the associated engine (not shown). Thus the pulse repetition period $T_o$ becomes shorter as the engine speed increases. If desired, the sensor circuit 12 may sense the rate of rotation of a ring gear (not shown) operatively coupled to the engine.

The fixed frequency oscillator 14 oscillates at a predetermined fixed frequency corresponding to the rate of rotation of the engine when operated in a predetermined mode, for example, substantially in the idling mode. Thus the oscillator 14 provides pulses similar to those drived from the rotation sensor circuit 12. The lower limit detector or a threshold circuit 16 receives the pulses from the sensor circuit 12 to detect if a predetermined rate of rotation of the engine, in this case, a rate thereof in the idling mode of operation is reached. Thereupon the lower limit detector 16 produces a transfer signal for controlling the transfer circuit 18.

More specifically, the transfer circuit 18 is operative to conduct the rotation pulses $t_o$ from the sensor 12 to the index pulse generator circuit 20 therethrough when the rate of rotation of the engine is greater than the predetermined value as determined by the lower limit circuit 16 and to conduct the rotation pulses $t_o$ from the oscillator 14 to the index generator circuit 20 therethrough when the rate of rotation of the engine is equal to or less than the predetermined value thereof as determined by the lower limit circuit 16, that is, during the shutting down or possibly starting up of the engine or in the idling mode of operation. In other words, if the engine is slowed down below a predetermined value, the oscillator 14 takes over the duty of the rotation sensor circuit 12. Then the index pulse generator circuit 20 is triggered by the pulses passed through the transfer circuit 18 to generate rectangular index pulses $t'_o$ (see waveform $b$ in FIG. 2). The index pulses $t'_o$ are applied to both the control signal generator circuit 30 and the series combination of the time delay circuits 22A, 22B, . . . , 22N alternating with control pulse generator circuits 24A, 24B, . . . , 24N.

Each index pulses $t'_o$ is applied to the first time delay circuit 22A where it is delayed by a time interval $T_1$ and is then applied to the first pulse generator circuit 24A. The circuit 24A is responsive to the delayed index pulse applied thereto to provide an intelligence pulse $t_1$ (see waveform $c_A$ in FIG. 2) including an intelligence from the signal source 26A for the associated electric installation 28A at a predetermined time point or a time interval $T_1$ after the index pulse $t'_o$ has been generated as shown in FIG. 2b. Then the intelligence pulse $t_1$ is supplied to the control generator circuit 30 and also to the second time delay circuit 22B.

The process as above described in successively repeated with the succeeding pairs of time delay and pulse generator circuits respectively whereby intelligence pulses containing intelligences from the respective sources 26A, 26B, . . . , 26N are generated by the associated pulse generator circuits 24A, 24B, . . . , 24N with incremental delay times relative to the preceding intelligence pulses. In FIG. 2 the circuit 24B is shown as generating the intelligence pulse $t_2$ with a delay time $T_2$ with respect to the pulse $t_1$ (see waveform $C_B$) and the next succeeding circuit 24C(not shown) generates the intelligence pulse $t_3$ with a delay time $T_3$ with respect to the pulse $t_2$ and so forth until the circuit 24N generates the intelligence pulse $t_n$ at the end of a time interval $T_n$ measured from the occurrence of the just immediately preceding pulse (see waveform $c_N$). The intelligence pulses $t_1, t_2, t_3, \ldots, t_n$ are sequentially applied to the control generator circuit 30.

As above described, the rotation pulse $t_o$ immediately results in the index pulse $t'_o$ which is, in turn, followed by the intelligence pulses $t_1, t_2, \ldots, t_n$. However the last intelligence pulse $t_n$ should terminate before the succeeding rotation pulse $t_o$. That is, the pulses $t'_o, t_1, t_2, \ldots, t_n$ are required to occur within one pulse repetition period $T_o$ of the rotation pulse $t_o$. To this end, the sum of the delay times $T_1, T_2, \ldots, T_n$ determined by the delay circuits 22A, 22B, . . . , 22N respectively should be less than the pulse repetition period $T_o$ of the rotation pulse $t_o$ generated by the rotation sensor circuit 12 for a maximum value of the number of rotation of the engine. Also in order to prevent the intelligence pulses $t_1, t_2, \ldots, t_n$ from temporally overlapping one another, the delay times $T_1, T_2, \ldots, T_n$ are chosen to be greater than a longest one of the durations of the intelligence pulses $t_1, t_2, \ldots, t_n$. In addition, the index pulse $t'_o$ must have its duration substantially equal to twice a greatest one of the durations of the intelligence pulses $t_1, t_2, \ldots, t_n$ for the purposes as will be apparent later. The duration of any pulse may be determined by any suitable means well known in the art.

The index pulse $t'_o$ and the intelligence pulses $t_1, t_2, \ldots, t_n$ are combined by the control signal generator circuit 30 to form a time-divided multiplexed signal or pulse train as shown at waveform $d$ in FIG. 2. The pulse train $d$ is transmitted through the transmission line 32 to a plurality of signal detector units 34A, 34B, . . . , 34N disposed in place on the vehicle (not shown) to be connected to the respective electric installations 28A, 28B, . . . , 28N. The signal detector units 34A through 34N are identical in operation to one another with the exception that the decoders 40A, 40B, . . . , 40N differ in that each responds to a different pulse in the pulse train to provide an output. Therefore only the signal detector unit 34B will now be, by way of example, described in detail.

In the signal detector unit 34B, the index separation circuit 36B receives the waveform $d$ or pulse train from the control generator circuit 30 through the transmission line 32 to separate the index pulse $t'_o$ from the pulse train to provide a resetting pulse for the counter circuit 38B. This resetting pulse is applied to the counter circuit 38B to reset or clear the latter. The reset counter 38B is initiated to count the intelligence pulses $t_1, t_2, \ldots, t_n$ following that index pulse $t'_o$. In other words, when the index pulse $t'_o$ reaches the index separation circuit 36B, the resetting pulse is developed from that circuit. Then, each time one of the intelligence pulses reaches the counter circuit 38B, the latter counts "one" so that it produces binary counts in the form of a predetermined binary code, in the example illustrated, a conventional 3-bit binary code as shown at waveform $e_1$, $e_2$ and $e_3$ resulting in eight pulses being counted. If it is desired to count more than eight of the intelligence pulses, all that needs to be done is to increase the number of bits utilized in the binary counter circuit 38B. The counts on the counter circuit 38B are successively applied to the decoder 40B for decoding. More specifically, in the signal detector unit 34B, when the counter circuit 38B counts the second intelligence pulse $t_2$ from the index pulse to produce a corresponding output having the waveform $e_1$ portion low (L) in amplitude, the waveform $e_2$ portion high (H) in amplitude and the waveform $e_3$ portion high (H) in amplitude (see FIGS. $2e_1$, $2e_2$ and $2e_3$), the decoder 40B produces a separation pulse as shown at waveform $f_B$ in FIG. 2 assigned to the electric installation 28B.

The waveform $f_B$ is applied to the intelligence separation circuit 42A also having directly applied thereto the time-divided, multiplexed pulse train on the transmission line 32. From FIGS. 2d and $2f_B$ it will be seen that when the waveform $f_B$ is being applied to the intelligence separation circuit 42B, the pulse portion labelled $t_2$ of the pulse train or waveform d is applied to the same circuit 40B and is separated by the pulse train as shown at waveform $g_B$ in FIG. 2. The intelligence pulse thus separated is labelled $t_2$ in FIG. $2g_B$ and applied to the discriminator circuit 44B to be restored to the original intelligence provided by the source 26B. Then the driving circuit 46B responds to the restored intelligence from the discriminator circuit 44B to cause the electric installation 28B to be driven into operation through a power line (not shown). The process as above described is repeated with each of the succeeding rotation signal $t_o$ or for each period $T_o$.

The remaining signal detector units 34A, 34B, . . . , 34N are operated as does the present detector units 34B but the decoders 40A, 40B, . . . , 40N different from one another in the count on the associated counter circuit. When the counter circuits to which it responds to provide an output 38A, 38B, . . . , 38N count predetermined numbers of the intelligence pulses respectively, the associated decoder circuits produce respective outputs. For example, when the counter circuits 38A counts a first intelligence pulse $t_1$ from the index pulse $t'_o$, the counter circuit 38A produces its output including the waveform $e_1$ portion high (H) in amplitude, the waveform $e_2$ portion high (H) in amplitude and the waveform $e_3$ portion high (H) in amplitude as shown in FIGS. $2e_1$, $2e_2$ and $2e_3$, resulting in the formation of waveforms $f_A$ and $g_A$ as shown in FIG. 2. The decoder 40N is adapted to respond to that count on the associated counter circuit 38N resulting from the Nth intelligence pulse $t_n$ from the index pulse $t'_o$ to produce the $e_1$ portion low (L), the $e_2$ portion low (L) and the $e_3$ portion low as shown in FIGS. $2e_1$, $2e_2$ and $2e_3$ leading to the formation of waveforms $f_N$ and $g_N$ as shown in FIG. 2.

In this way, selected ones of the electric installations 28A, 28B, . . . , 28N can be driven in accordance with those intelligence pulses assigned thereto and decoded from the control signal transmitted through the transmission line.

As above described, the present invention can selectively transmit the respective intelligences to the N electric installations 28A, 28B, . . . , 28N. In addition, the invention utilizes, as the index pulse, the signal representing the rate of rotation of the engine and therefore is possible to transmit the rate of rotation of the engine. Thus the pulse output from each of the index separation circuits 36A, 36B, . . . , 36N provides a measure of the rate of rotation of the engine.

In the arrangement as shown in FIG. 1, one intelligence pulse assigned to each of the electric installations 28A, 28B, . . . , 28N is delivered only once during the time interval $T_o$ corresponding to the rate of rotation of the engine. Under these circumstances, if the intelligence pulses have a pulse repetition frequency (the receprocal of the time interval $1/T_o$) preselected to exceed twice the maximum of the frequencies produced by the intelligence sources 26A, 26B, . . . , 26N then the original intelligence as provided by the sources can be restored on the side of the electric installations in accordance with the sampling theorem well known in the art. Considering the frequencies of the intelligence sources equipped on the vehicle and the temperature of the operating engine, a reading on the fuel meter can very slowly change offering no problem. Also time delays inherent to various operating switches controlled by the driver or operator do not come into question. Among the signals used with the vehicle, the rotation signal indicating the rate of rotation of the engine has the highest frequency. According to the present invention, the index pulse is the rotation signal. Therefore it is not required to render the sampling frequency higher in order to transmit the rotation signal.

The present invention is characterized in that the rotation signal is used as the index pulse. This permits the intelligence from the sources 26A, 26B, . . . , 26N to be transmitted to the associated electric installations 28A, 28B, . . . , 28N in any desired manner other than the manner as above described in conjunction with FIGS. 1 and 2.

Figure 3:
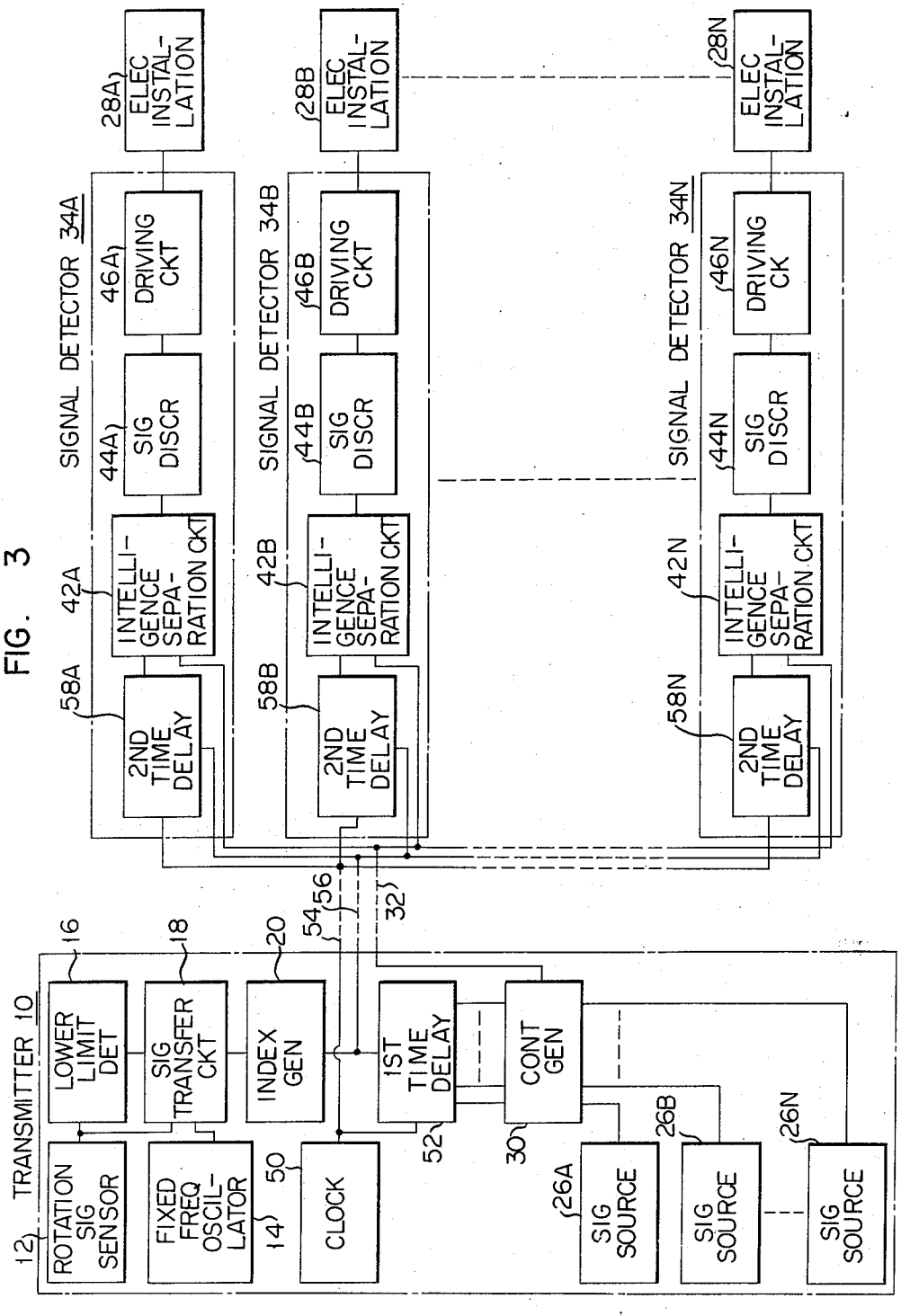
FIG. 3 is a view similar to FIG. 1 but illustrating a modification of the invention.

FIG. 3, wherein like reference numerals designate the components corresponding to those shown in FIG. 1 illustrates, by way of example, a modification of the invention. As shown, a clock or reference time generator circuit 50 is connected to a first time delay circuit 52 and also through a clock transmission line 54 to a plurality of signal detector units 34A, 34B, . . . , 34N. The first time delay circuit 52 is connected to the output of the index pulse generator circuit 20 and the junction of these two elements is connected to all the index detector units 34A, 34B, . . . , 34N through an index transmission line 56. Then a plurality of signal sources 26A, 26B, . . . , 26N are connected directly to the control generator circuit 30 and the associated time delay circuits as shown in FIG. 1. The first time delay circuit 52 is connected to the control generator circuit 30 through a plurality of leads, one for each signal source 26A, 26B, . . . , 26N.

In each of the signal detector units 34A, 34B,...34N, a second time delay circuit 58A, 58B, . . . ,58N is substituted for the combination of index separation, counter and decoder circuits 36A, . . . , 36N, 38A, . . . ,38N and 40A, . . . ,40N respectively as shown in FIG. 1 and has connected thereto the clock and index transmission lines 54 and 56 respectively. On the other hand, the control transmission line 32 such as shown in FIG. 1 connects the control generator circuit 30 to only the intelligence separation circuit 42A, 42B, ..., 42N.

In other respects the arrangement is identical to that shown in FIG. 1.

The operation of the arrangement as shown in FIG. 3 will now be described with reference to FIG. 4. As in the arrangement of FIG. 1, the index pulse generator circuit 20 is triggered by each of the rotation pulses (see waveform $a$ in FIG. 4) produced by the rotation sensor circuit 12 and generate an index pulse $t'_o$ as shown at waveform $b$ in FIG. 4. Unlike the index pulses $t'_o$ generated in the arrangement of FIG. 1, the index pulse $t'_o$ developed in the arrangement of FIG. 3 is not required to be different in duration from intelligence pulses $t_1, t_2, \ldots, t_n$ as will be described hereinafter, because the index pulses are transmitted to the signal detector units 34A, 34B, ..., 34N through their own transmission line 56. The index pulses $t'_o$ are also applied to the first delay circuit 52.

Figure 4:
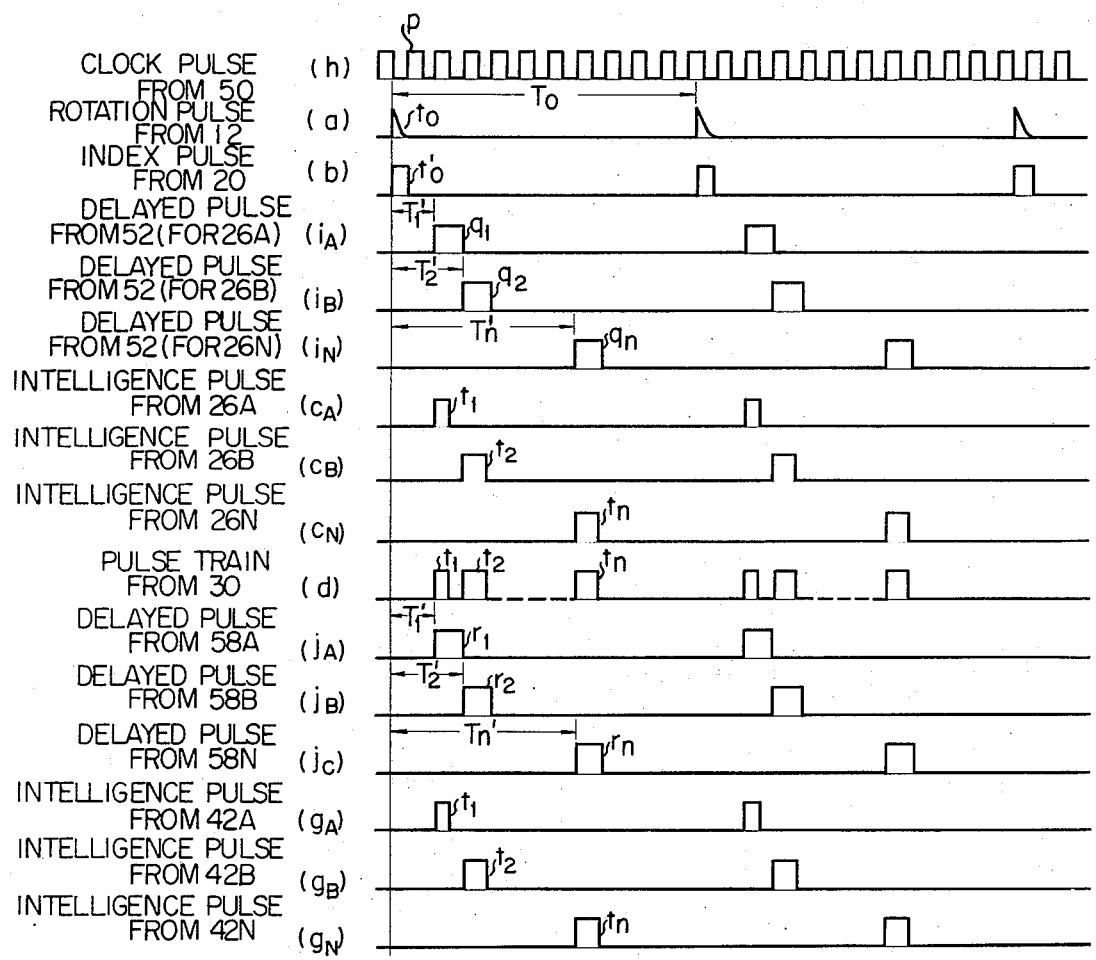
FIG. 4 is a graph illustrating waveforms developed at various points in the arrangement shown in FIG. 3.

On the other hand, the clock 50 provides a train of clock pulses $p$ as shown at waveform $h$ in FIG. 4 applied to the first time delay circuit 52 and through the clock transmission line 56 to all the second time delay circuits 58A, 58B, ..., 58N. The clock pulses $p$ preferably have a pulse repetition frequency greater than the maximum repetition frequency of the rotation pulse $t_o$ by a factor of several tens or more. The first delay circuit 52 receives both of the index pulses $t'_o$ and the train of clock pulses $p$ to assign all time points to the signal sources 26A, 26B, ..., 26N. More specifically, each time the first time delay circuit 52 receives the index pulse $t'_o$ from the index generator circuit 20, it counts the clock pulses $p$ to form a delayed pulse $q_1$ after the lapse of a time interval $T'_1$ from the occurrence of that index pulse $t'_o$, and form a delayed pulse $q_2$ after a time interval $T'_2$ from the occurrence of the same index pulse $t'_o$ and so on. When a time interval $T'_n$ is timed out starting with the occurrence of the indexing pulse $t'_o$, a delayed pulse $q_n$ will developed. The delayed pulses $q_1, q_2$ and $q_n$ are typically shown in FIG. $4i_A, 4i_B$ and $4i_N$ along with their own delay times $T'_1, T'_2$ and $T'_n$. Those delayed pulses $q_1, q_2, \ldots, q_n$ are successively supplied to the control generator circuit 30 to determine when the latter is to generate intelligence pulses $t_1, t_2, \ldots, t_n$ including the intelligences provided by the sources 26A, 26B, ..., 26N operatively coupled to the electric installations 28A, 28B, ..., 28N respectively.

As the index pulses $t'_o$ are not in synchronization with the clock pulses $p$, the delay times $T'_1, T'_2, \ldots, T'_n$ may vary due to the time relationship between the pulses $t_o$ and the pulses $p$. However it is noted that an instantaneous value of any of those delay times is not different on the transmitting side from on the detecting side, and therefore such a variation in the delay time causes no objection.

The delayed pulses $q_1, q_2, \ldots, q_n$ are successively applied to the control generator circuit 30 so that, each time the delay pulse is developed, a corresponding one of the intelligence pulses $t_1, t_2, \ldots, t_n$ (see waveform $c_A, c_B, c_N$ in FIG. 4) including the intelligence provided by the associated signal source is generated. The control generator circuit 30 also combines the intelligence pulses into a time-divided multiplexed signal or pulse train as shown at waveform $d$ in FIG. 4. It is to be noted that the pulse train thus combined includes no index pulse. Then the pulse train is supplied through the transmission line 32 to the intelligence separation circuits 42A, 42B, ..., 42N.

The second time delay circuits 58A, 58B, ..., 58N in each of the signal detector units 34A, 34B, ..., 34N receives both the train of clock pulses $p$ and each index pulse $t'_o$ to form a delayed pulse as does the first delay circuit 52 but unlike the delay circuit 52 it is required only to form a single delayed pulse corresponding to the electric installation connected to each detector unit. For example, the second time delay circuit 58A is adapted to generate a delay pulse $r_1$ (see waveform $j_A$ in FIG. 4) while the time delay circuits 58B and 58N are adapted to generate delayed pulses $r_2$ and $r_n$ as shown at waveforms $j_B$ and $j_C$ in FIG. 4. It is to be noted that those delayed pulses $r_1, r_2, \ldots, r_N$ coincide with the delayed pulses $q_1, q_2, \ldots, q_n$ from the first time delay circuit 52 respectively.

As in the arrangement of FIG. 1, the delayed pulse from each of the second time delay circuits 58A, 58B, ..., 58N is applied to the associated intelligence separation circuit 42A, 42B, ..., 42N to separate from the pulse train supplied to the separation circuit 42A, 42B, ..., 42N that intelligence pulse assigned to the mating electric installations 28A, 28B, ..., 28N as shown at waveform $q_1, q_2,$ or $q_n$ in FIG. 4.

In other respects, the arrangement of FIG. 3 is operated in the similar manner as above described in conjunction with FIGS. 1 and 2.

The arrangement of FIG. 3 is similar to that shown in FIG. 1 in that the rotation pulse is utilized as the index pulse but is different in that in FIG. 3 the three transmission lines are used. The use of the three transmission lines not only eliminates the necessity of forming a special index pulse but also simplifies the construction of the signal detector units.

The present invention has several advantages. For example, it can effectively prevent any malfunction of the system due to noise. The arrangements as shown in FIGS. 1 and 2 are generally formed of electronic circuits each including a multiplicity of semiconductor elements wherein malfunctions due to external noise come into question. In automobiles, especially, the ignition system can generate extremely high noises leading to a high probability of system malfunction. More specifically, the ignition system generally generates noise such that, at the instant the associated breaker's contacts are opened to form an electric spark across an ignition plug involved, very high noise is generated after which, noise continues to occur during some time interval. After the completion of that time interval, no noise will occur until the succeeding electric spark is formed across the ignition plug. In order to prevent such noise from causing any malfunction of the system it is sufficient to inhibit the intelligence pulses as above described from being generated during the time interval in which the system is noisy. The present invention makes it possible to do so. For example, in the arrangement as shown in either of FIGS. 1 and 3, wherein the rotation pulse $t_o$ is generated to cause the index pulse $t'_o$, the delay time $T_1$ for the first delayed pulse $T_1$ (see FIG. $1c_A$) or pulse $q_1$ (see FIG. $4i_A$) relative to the index pulse $t'_o$ may be long enough to put an time interval of quiet after each of the index pulses during which noise may be caused due to electric spark or sparks across the ignition plug.

One of the greatest advantages of the present invention is to simplify the wiring configuration required for the electric installations. This is because individual control signals are transmitted in the form of a time-divided multiplexed pulse train to a plurality of electric installations with the use of a signal representing the rate of rotation of the associated engine as an index pulse for the time-divided control pulse train with the result that the connections to the electric installations is simplified by using both a single power line and one or a few lengths of control wire.

What we claim is:

1. A control system for controlling electrical installations on a motor vehicle which may be isolated from noise created by the motor vehicle ignition system, comprising:
   a plurality of control operating means each having an output, the number of said control operating means being equal to the number of electrical installations provided on the motor vehicle with each of said plurality of control operating means generating an output information signal at the output thereof;
   transmission means coupled to the outputs of each of said control operating means for transmitting said respective output information signals in the form of a time divided multiplexed signal to said electrical installations;
   a plurality of signal detecting means, each of said signal detecting means connected to said transmission means and a different one of said electrical installations for detecting information from said time divided multiplexed signal relating to the electrical installation and operating said electrical installations, said information being determined by said control operating means; and
   sensing means including a rotation sensor having an input and an output, said input operatively coupled to the motor on said motor vehicle for sensing the rate of rotation of the motor of said motor vehicle and for providing an output signal indicative of the rate of rotation at the output thereof, said output being operatively coupled to said signal detecting means whereby said output signal is used as an indexing signal for said time multiplexed signals.

2. The device of claim 1, wherein said sensing means further comprises:
   a fixed frequency oscillator generating a fixed frequency output signal;
   detecting means having inputs receiving said fixed frequency output signal and said output signal indicative of the rate of rotation for determining whether or not said rate of rotation is above a predetermined value, and producing an output signal having a frequency euqal to said rate of rotation signal when the sensed rate of rotation is above said predetermined value and having the frequency of said oscillator fixed frequency output signal when said rate of rotation is equal to or less than said predetermined value, and the output of said detecting means being connected to said transmission means for inclusion in said time divided multiplexed signal.

3. The device of claim 2, wherein said plurality of signal detecting means are in parallel relationship and said transmission means comprises a single transmission line and a control signal generator means coupled to said plurality of parallel signal detecting means, and wherein each of said control operating means is comprised of a plurality of time delay means and a plurality of intelligence pulse generator means each having an output, interspaced in a series arrangement with each of said intelligence pulse generator means producing an output pulse at a different time due to said interspaced time delay means, a plurality of signal sources, one signal source coupled to each of said intelligence pulse generating means, and said control signal generator means coupled to each of said outputs of said intelligence pulse generating means and said detecting means.

4. The device of claim 3, wherein each of said signal detecting means is respectively comprised of isolation means coupled to the transmission means for isolating an output information pulse from the time divided multiplexed signal and discriminator means coupled to said isolation means for receiving said output information pulse and restoring said signal to the original intelligence provided by said respective control operating means, each of the restored signals being applied to the respective electrical installation.

5. The device of claim 4, wherein said isolation means comprises an index separation means coupled to the transmission means to separate index pulses from the time divided multiplexed signals and for producing an output signal upon detection of the separated index pulses, a counter means, a decoder means and an intelligence separation means, said counter means coupled to the transmission means for counting the information signals present in the time divided multiplexed signals, said counter means having a reset means coupled to said index separation means whereby said counter means is reset when an output signal is produced by said index separation means, said counter means producing an output when the number of pulses counted by said counter means is equal to a preset number indicative of the relative position of a specific information pulse in said time divided multiplexed signal, said decoder means having an input connected to the output of said counter means and an output, said intelligence separation means coupled to the output of said decoder means and said transmission means for isolating the specific intelligence signal from said multiplexed signal, the occurrance of which pertinent intelligence signal is indicated by the output of said decoder means.

6. The device of claim 5, wherein said discriminator means is coupled to said intelligence separation means and further including a driving circuit means coupled to said discriminator means for developing an output signal capable of causing the associated electrical installation to be driven into operation.

7. The device of claim 1, wherein said sensing means further comprises:
   a clock means operatively coupled to each of said signal detecting means and to said transmission means;
   a fixed frequency oscillator generating a fixed frequency output signal;
   detecting means having inputs receiving said fixed freqeuncy output signal and said output signal indicative of the rate of rotation, for determining whether or not said rate of rotation is above a predetermined value and producing an output signal having a frequency equal to said rotation sensor output signal when said rate of rotation is above said predetermined value and otherwise having the frequency of said fixed frequency oscillator, said detecting means output signal being used as an index signal for said time divided multiplexed signal being applied to said signal detecting means.

8. The device of claim 7, wherein said signal detecting means each comprise a time delay means each having a time delay for producing a delayed output signal coupled to said clock means and to said detecting means, each said time delay chosen according to the position of a desired information pulse in the time divided multiplexed signal, an intelligence separation means coupled to said transmission means and said time delay means for isolating the intelligence relating to the corresponding electrical installation from said time divided multiplexed signal, and a discriminator means coupled to said intelligence separation means for restoring the information signal isolated by said intelligence separation means to the original intelligence provided by said respective control operating means and producing an output signal adapted to drive said associated electrical installation into operation.

9. The device of claim 8, wherein said signal detecting means each respectively comprise a driving circuit means coupled to said discriminator means for developing a drive signal from said discriminator means output signal to cause the associated electrical installation to be driven into operation.

* * * * *